UNITED STATES PATENT OFFICE.

ROBERT L. COHEN, OF PHILADELPHIA, PENNSYLVANIA.

IMPROVEMENT IN MANUFACTURE OF VAPOR GAS.

Specification forming part of Letters Patent No. 141,119, dated July 22, 1873; application filed May 13, 1873.

*To all whom it may concern:*

Be it known that I, ROBERT L. COHEN, of Philadelphia, in the county of Philadelphia and State of Pennsylvania, have invented certain new and useful Improvements in Manufacture of Vapor Gas; and I do hereby declare the following to be a full, clear, and exact description of the invention, such as will enable others skilled in the art to which it pertains to make and use it.

My invention has for its object to improve the quality of the illuminator known as vapor gas, and which is generated from gasoline. The special objects of the improvements are, first, to prevent condensation of the gas in the pipes; and, second, to impart greater brilliancy to the flame. The nature of the invention consists in the employment of chloride of lime (either alone or in conjunction with sulphuric ether) in the manner hereinafter set forth.

The vapor gas is generated in the ordinary manner, and is discharged from the carbureter by means of a blower, of construction specially adapted to the purpose. In its exit from said carbureter the gas passes over a tank therein, containing a quantity of chloride of lime.

The effect of this operation is to produce a very superior quality of gas. The chemical or other combination produced I am unable to say, though my belief is that the chlorine unites with the other gas, from which the watery particles are absorbed by the lime. That a beneficial result will be produced I know from a series of actual tests, proving beyond question that the illuminating power of the gas is increased, and its tendency to condensation diminished.

The amount of chloride of lime used will be in proportion to the size of the machine—for a ten-light gas-machine a quarter peck will amply suffice.

The quality of the gas will be further improved by the addition of sulphuric ether, which may be mixed with or thrown directly into the gasoline, using, say, a pound, for a a machine of the size above mentioned, and proportionate quantities for larger or smaller machines.

What I claim as my invention is—

1. The employment, in the manufacture of vapor gas, of chloride of lime, substantially as set forth.

2. The employment, in the manufacture of vapor gas, of chloride of lime and sulphuric ether, substantially as set forth.

In testimony that I claim the foregoing I I have hereunto set my hand this 10th day of May, 1873.

ROBERT L. COHEN.

Witnesses:
GEO. C. SHELMERDINE,
M. DANL. CONNOLLY.